Patented July 29, 1952

2,605,254

UNITED STATES PATENT OFFICE 2,605,254

TOUGH, STRONG, AND EASILY-PROCESSED VINYL CHLORIDE INTERPOLYMERS CONTAINING FREE SIDE-CHAIN CARBOXYL GROUPS

Robert J. Wolf, Cleveland, Ohio, assignor to The B. F. Goodrich Company, New York, N. Y., a corporation of New York No Drawing. Application May 22, 1951, Serial No. 227,731

7 Claims. (Cl. 260—78.5)

The present invention relates generally to tough, strong, easily-processable vinyl chloride interpolymers containing free side-chain carboxyl (—COOH) groups, and to the production of sheets, films and coatings, etc., therefrom.

I have discovered that thermoplastic and easily processed, yet very tough and strong, vinyl chloride interpolymers are produced by the polymerization in an acidic medium of monomeric mixtures containing three essential types of monomers, each in particular proportions, one being vinyl chloride, another being an alkyl acrylate and the third being an ester containing a vinyl group and a free carboxyl group, of a class to be herein more fully defined. The resultant interpolymers containing free side-chain carboxyl (—COOH) groups are characterized by the ability to be easily processed and shaped at moderate temperatures of 150 to 250° F., yet at ordinary temperatures, especially when formed into a homogeneous coherent mass such as a film, sheet or coating, they are remarkably tough and strong. They possess extremely high tensile strength at both ordinary and elevated temperatures; they are tack-free and they possess the ability to remain flexible at low temperatures, as well as other desirable properties.

Unlike most comonomers, the esters containing a vinyl group and a free carboxyl group, when interpolymerized with vinyl chloride and an alkyl acrylate have a very pronounced strengthening or toughening effect, even when utilized in amounts as small as 1 or 2% or less of the total monomeric mixture. This strengthening effect is quite unique because it is achieved without sacrifice of processing characteristics, low temperature flexibility or any other desirable plastic property possessed by the corresponding vinyl chloride acrylate copolymer. It is not fully understood but it is believed that the hydrogen atoms of the carboxyl groups in the polymer function as the loci of hydrogen "bridging" or bonding established between adjacent polymer chains. The bond produced appears to be easily disrupted by mastication and/or heating only to be re-established upon cooling. This "hydrogen bonding" between adjacent polymer chains is probably not fully established until the thermoplastic interpolymer has been compacted by heat or subjected to working in the stretched out condition and the polymer chains brought in close proximity and somewhat in axial alignment as is obtained by masticating, extruding, calendering and other fusing, homogenizing and shaping operations. Consequently, the fullest strength and toughness of the interpolymers of this invention are realized when the interpolymer containing side-chain carboxyls is converted into thin films, sheets, tubes, coatings, and other thin coherent, homogeneous integuments having one dimension less than about ¼ inch, and preferably less than about 25 mils.

The relative proportions of monomers which are employed in the production of my interpolymers are somewhat critical, since the desired properties are not secured with these monomers in any proportion, but may vary within certain limits. In the monomeric mixture I have found it necessary to employ from 35 to 90% by weight of vinyl chloride, from 5 to 65% by weight of the alkyl acrylate and from 0.2 to 25% by weight of one or more than one of the vinyl and carboxyl-containing esters with at least 90% by weight of the monomeric mixture being made up of these three ingredients. Other monomeric materials such as vinylidene chloride, vinyl acetate, vinyl benzoate, diethyl fumarate, acrylonitrile, styrene, lower alkyl acrylates such as methyl and ethyl acrylate and others are, if desired, utilizable to the extent of 10% by weight of the total monomeric mixture but is preferred that only monomeric material of the three specified types be present. Particularly valuable are those interpolymers made from monomeric mixtures containing from 40 to 85% by weight of vinyl chloride, from 10 to 50% by weight of a higher alkyl acrylate in which the alkyl group contains from 4 to 10 atoms, and from 0.5 to 10% by weight of the ester monomer. In the production of interpolymers within the monomeric proportions defined herein it is of course intended that if a maximum amount of one of the monomers is employed by implication less than maximum amounts of at least one of the others must be employed.

Any of the alkyl acrylates are utilizable in the production of the interpolymers according to this invention, the choice of them depending on the properties desired in the interpolymer. Suitable acrylates are methyl acrylate, ethyl acrylate, propyl acrylate, n-butyl acrylate, n-amyl acrylate, n-hexyl acrylate, n-heptyl acrylate, isohexyl acrylates, n-heptyl acrylate, isoheptyl acrylates, capryl acrylate (1-methylheptyl acrylate), n-octyl acrylate, 2-ethylhexyl acrylate, isooctyl acrylates such as 6-methylheptyl acrylate, n-nonyl acrylate, isononyl acrylates such as 3,5,5-trimethylhexyl acrylate, n-decyl acrylate, lauryl acrylate and others.

I have found that interpolymers are produced from higher alkyl acrylates in which the alkyl group contains from 4 to 10 carbon atoms, which are very strong and tough yet which are easily processed without plasticizer at moderate temperatures. Illustrative higher alkyl acrylates within the above class utilizable in this invention include n-butyl acrylate, n-amyl acrylate, n-hexyl acrylate, isohexyl acrylates, isoheptyl acrylate, n-heptyl acrylate, capryl acrylate (1-methylheptyl acrylate), n-octyl acrylate, iso-octyl acrylates such as 6-methylheptyl acrylate, n-nonyl acrylate, isononyl acrylates such as 3,5,5-trimethylhexyl acrylate, n-decyl acrylate and others.

It is greatly preferred to employ higher alkyl acrylates in which the alkyl group contains a total of 8 to 10 carbon atoms and possesses a carbon chain of 6 to 10 atoms. Compounds within this preferred class are 6-methylheptyl acrylate, 3,5,5-trimethylhexyl acrylate, 2-ethylhexyl acrylate, capryl acrylate (1-methylheptyl acrylate), n-octyl acrylate and others. The acrylates of this class have been found to impart the greatest ease of processing to the interpolymers of this invention and the most efficient in this respect is n-octyl acrylate.

The vinyl and carboxyl containing esters which are utilized in the preparation of the interpolymers of this invention are characterized by possessing a single vinyl

group and at least one carboxyl

group separated from each other by an ester linkage. They have the general structure

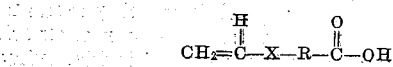

wherein X is the ester linkage, either

or

and R is a divalent saturated aliphatic radical. The vinyl group, of course, enters into the polymerization while the free carboxyl group is present in a side-chain. Such esters include the monovinyl esters of aliphatic polycarboxylic acids such as oxalic acid, malonic acid, chloro- and bromo-malonic acids, hydroxy-malonic acid (tartronic acid), dihydroxy-malonic acid, methyl malonic acid (isosuccinic acid), ethyl malonic acid, succinic acid, 2-hydroxy succinic acid (malic acid), bromo-succinic acid (2-bromobutanedioic acid), alpha-beta-dihydroxy succinic acid (tartaric acid), ethyl succinic acid, alpha-hydroxy-alpha-methyl succinic acid (citromalic acid), acetoxy-succinic acid, glutaric acid, alpha-hydroxy-glutaric acid, adipic acid, pimelic acid, suberic acid, azelaic acid, sebacic acid, brassylic acid, thapsic acid and others. Other esters of this type include acryloxy-acetic acid, beta-acryloxy propionic acid, 4-carboxy-butyl acrylate and similar esters which may be considered as carboxy-substituted acrylates. The preferred esters are those of the above structure wherein R is an alkylene group, preferably of 2 to 12 carbon atoms. It is more preferred to utilize the monovinyl esters of saturated dicarboxylic acids containing from 4 to 12 carbon atoms because of their ability to produce the strongest polymers. Of these, monovinyl adipate and monovinyl sebacate are particularly preferred.

The polymerization to form my new interpolymers may be carried out in any conventional manner although polymerization in aqueous emulsion, which may or may not contain an added emulsifier, is of course essential when a latex of the interpolymers is the desired end-product. In addition to this preferred method, the mixture of monomers may be polymerized in an aqueous medium containing a colloidal suspension agent such as gelatin, bentonite clay, polyvinyl alcohol, polyacrylic acid, water-soluble phenol-aldehyde and urea-aldehyde condensation products and others, the latter method being an aqueous suspension method known as the "pearl" type method and results in a fine uniform granular polymer. In addition to the latter methods the polymerization of the monomeric mixture may be accomplished in solution in a suitable solvent in which case the interpolymer is obtained either as a granular precipitate or as a solution in the solvent, depending on the choice of solvents. The polymerization may also be performed in the absence of a solvent or diluent to obtain a solid mass of the interpolymer. Polymerization in an acidic aqueous medium to obtain either a polymeric dispersion or later or a granular precipitate is greatly preferred.

Since it is essential that the interpolymers of this invention contain free side-chain carboxyl (—COOH) groups, it is necessary to carry out the polymerization reaction in an acidic medium so as to protect the carboxyl groups. In view of the fact that a vinyl chloride polymerization medium naturally tends to become acid during reaction due to liberation of hydrochloric acid and also since the monovinyl carboxyl-containing esters exhibit an acid reaction this is accomplished most readily by omitting strongly alkaline soaps, emulsifiers, buffers, etc. and utilizing an emulsifier stable at a pH below 7.0. In general, polymerization is satisfactorily carried out at a pH ranging from 2.0 to 7.0 and more preferably from 4.0 to 7.0. For this purpose most of the synthetic anionic emulsifiers such as the hymolal sulfates and sulfonates, the cationic emulsifiers such as the salts of organic bases containing long carbon chains and the so-called non-ionic emulsifiers such as the polyether alcohols prepared by condensing ethylene oxide with higher alcohols and others are suitable.

Whatever method of polymerization is employed a catalyst will generally be necessary. The catalyst may be of any of those generally employed for the polymerization of vinyl and vinylidene compounds. Actinic radiation may be employed, as well as the various peroxygen compounds such as hydrogen peroxide, benzoyl peroxide, o,o'-dichlorobenzoyl peroxide, caproyl peroxide, caprylyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium and ammonium persulfate, sodium perborate, sodium percarbonate and others.

While the polymerization may be carried out in the presence of air, the rate of reaction is ordinarily faster in the absence of molecular oxygen and hence polymerization in an evacuated vessel or under an inert atmosphere is preferred. The temperature at which the polymerization is carried out is not critical, it may be varied widely from −30° to 100° C. or higher, though best results are generally obtained at a temperature of about 0° C. to about 70° C.

In addition to the necessity for polymerization under acidic conditions, it is also necessary that the carboxyl groups be not destroyed during the precipitation or coagulation step or subsequently exposed to alkaline materials. The isolation of the interpolymer from a polymer latex or dispersion is performed satisfactorily by freezing, spray-drying or coagulating with mildly acidified alcohol. The aqueous suspension method of polymerization yields granular polymers which need only be filtered, washed and dried. The resultant interpolymers require only working in the absence of alkaline materials at temperatures of 125 to 400° F., more preferably 150 to 250° F., to be converted to tough strong materials which are distinguished from the corresponding vinyl chloride alkyl acrylate copolymers by reduced tack, improved body on the mill, by improved stress-strain properties, especially at high temperatures, and by a tough "feel."

The preparation of the interpolymers of this invention, their properties, and representative uses thereof will be more clearly described in the following specific examples which are intended merely as illustrations of the nature of my invention and not as limitations on the scope thereof.

Example 1

A tripolymer is prepared by the polymerization of the monomeric materials contained in an aqueous emulsion having the following composition:

| Material | Parts/Weight |
|---|---|
| Vinyl chloride | 65.0 |
| 2-ethylhexyl acrylate | 34.0 |
| Monovinyl sebacate | 1.0 |
| Emulsifier [1] | 4.0 |
| Potassium persulfate | 0.2 |
| Water | 95.8 |

[1] A sulfonated petroleum fraction known as "Duponol 189 S" or "Alkanol DW."

The polymerization is complete by agitating the emulsion in a closed vessel for 8¾ hours at 50° C., with the production of an excellent latex containing 50.6% total solids and having a pH of 3.5. The latex is coagulated by freezing and the polymer washed and dried. A small sample of the dried granular coagulum is press-molded without plasticizer to form a thin disk of about 0.2 inch in thickness in only one minute at 140° C., which disk is flexible, has good body and is tack-free, smooth and completely fused. The press-molded disk has a hardness of 86 (Durometer A at 30° C.). The tripolymer has excellent strength and, in addition, showed surprisingly good high temperature strength. When the tensile strength of a tripolymer sheet formed by molding the milled tripolymer is measured at 125° F. it is found to be 73% of its tensile strength at room temperature. By contrast a copolymer prepared from a mixture of 65% by weight of vinyl chloride and 35% by weight of 2-ethylhexyl acrylate has a hardness of 80A and a tensile strength at 125° F. only 35 to 40% of its tensile strength at room temperature.

In a similar manner a tripolymer is prepared by the polymerization of a mixture consisting of 63% by weight of vinyl chloride, 35% 2-ethylhexyl acrylate and 2% by weight of monovinyl sebacate. This tripolymer has a hardness of 90A. The tripolymer, however, is easy to mill without plasticizer to produce a tough-feeling, smooth milled sheet having good body. A press-molded disk prepared as above is tough and flexible, smooth, tack-free, and completely fused.

Example 2

A tripolymer is made by polymerizing the monomeric materials contained in a reaction mixture having the following proportions:

| Material | Parts/Weight |
|---|---|
| Vinyl chloride | 55.0 |
| 2-ethylhexyl acrylate | 40.0 |
| Monovinyl sebacate | 5.0 |
| Emulsifier (Same as Example 1) | 4.0 |
| Potassium persulfate | 0.3 |
| Water | 95.7 |

The polymerization reaction is complete in 8¾ hours at 50° C. with the production of an excellent medium particle size latex containing 50% total solids. The coagulated polymer is milled without plasticizer to produce a smooth, tough sheet having good body yet the polymer as indicated by a hardness determination is fairly soft, the hardness being 60A. When extruded, calendered or molded the tripolymer forms tough rods and films which are very flexible over a wide temperature range. The tripolymer of this example has an A. S. T. M. brittleness temperature passing −60° F. and failing at −70° F. Its flexibility at very low temperatures is shown by the Clash-Berg flexibility test, a test in which a small strip of polymer is twisted through a given arc while immersed in a coolant and the temperature recorded at which a given amount of torsional stress is developed in the sample. The tripolymer of Example 2 has a Clash-Berg flexibility temperature of −39° C. under a loading of 135,000 lbs./sq. in. Polyvinyl chloride plasticized with as much as 50 parts/100 parts of resin so as to have a hardness of 85A has a flexibility temperature of only −22.5° C. at a similar loading.

Example 3

A tripolymer is prepared utilizing a reaction mixture prepared as follows:

| Material | Parts/Weight |
|---|---|
| Vinyl chloride | 60 |
| 2-ethylhexyl acrylate | 30 |
| Monovinyl sebacate | 10 |
| Potassium persulfate | 0.3 |
| Emulsifier (Same as Example 1) | 4.0 |
| Water | 235.0 |

The polymerization is substantially complete in 3 hours at 50° C. The resulting latex contains 26.8% total solids and has a pH of 4.0. The solid polymer coagulum upon being press-molded for one minute at 140° C. fuses readily to produce a smooth, clear and flexible disc having good body. The tripolymer is relatively harder than any of the interpolymers of the preceding examples. However, the tripolymer is milled on a two-roll plastic mill having its rolls maintained at only 200° F. and evidences good plasticity and coherency during milling. When removed from the rolls and cooled the polymer regains its toughness, hardness and high strength.

Example 4

The preceding examples have been concerned with the preparation of tripolymers from 3-component monomeric mixtures. Excellent tetrapolymers, however, are made from monomeric mixtures containing small additions of other monomers, for example, by the polymerization at 50° C. of the monomeric materials contained in a reaction mixture having the following composition:

| Material | Parts/Weight |
|---|---|
| Vinyl chloride | 64.0 |
| 2-ethylhexyl acrylate | 34.0 |
| 3-hydroxybutyl acrylate | 1.0 |
| Monovinyl sebacate | 1.0 |
| Emulsifier (Same as Example 1) | 4.0 |
| Potassium persulfate | 0.3 |
| Water | 95.7 |

Polymerization for 5 hours and 50 minutes results in a white medium particle size latex containing 52.1%. The solid tripolymer obtained by coagulation of the latex has excellent milling characteristics, the plastic exhibiting good body on the mill and producing a smooth tough but flexible sheet when milled without plasticizer. A press-molded sheet containing no plasticizer is flexible, smooth, and tack-free. The press-molded tensile strips have a hardness of 94A, a tensile strength at room temperature of 1900 lbs./sq. in., an elongation of 175% and a modulus at 100% elongation of 1400 lbs./sq. in. The same properties when measured at 125° F. are tensile strength 220 lbs./sq. in., 100% modulus, 1000 lbs./sq. in., and elongation 350%. In addition, the tetrapolymer has a Clash-Berg flexibility temperature at 135,000 p. s. i. of $-21°$ C. showing that it had extremely good low temperature flexibility as well as good high temperature properties.

Example 5

A tripolymer is prepared by the ploymerization of the monomeric materials contained in a reaction mixture of the following composition:

| Material | Parts/Weight |
|---|---|
| Vinyl chloride | 65.0 |
| 2-ethylhexyl acrylate | 30.0 |
| Monovinyl adipate | 5.0 |
| Emulsifier (Same as Example 1) | 4.0 |
| Potassium persulfate | 0.3 |
| Water | 95.6 |

The polymerization reaction is complete in 14 hours and 55 minutes with the production of a medium particle size latex containing 48.5% total solids. The tripolymer obtained from the latex is similar to those described in Examples 1 and 2 in that it is easily milled at a temperature of 200° F. without plasticizer yet is strong and tough at ordinary temperatures.

Example 6

Interpolymers varying slightly in hardness and processing characteristics are produced by polymerization in acidic aqueous suspension from monomeric mixtures employing other higher alkyl acrylates. For example, tripolymers made from a monomeric mixture consisting of 55% by weight of vinyl chloride, 40% of an alkyl acrylate and 5% by monovinyl sebacate are made utilizing ethyl acrylate, n-butyl acrylate, n-amyl acrylate, 6-methylheptyl acrylate (isooctyl acrylate), 2-ethylhexyl acrylate, n-octyl acrylate and isononyl acrylate (3,5,5-trimethylhexyl acrylate) as the alkyl acrylates. All of the tripolymers except the ethyl acrylate tripolymer are processed easily without plasticizer, the n-butyl and n-amyl acrylate tripolymers requiring the highest temperatures (200–250° F.) and the n-octyl acrylate tripolymer only 150° F.

Example 7

Still other triploymers are obtained by varying the proportions of the various monomeric materials. A tripolymer made utilizing a monomeric mixture consisting of 85% by weight of vinyl chloride, 14% by weight of n-octyl acrylate and 1% by weight of monovinyl sebacate is a material which is milled without plasticizer at temperatures below 200° F., yet is very hard and rigid and is therefore adapted to the production of hard rigid rods and tubes. A tripolymer obtained by the polymerization of a monomeric mixture consisting of 35% vinyl chloride, 50% of 2-ethylhexyl acrylate, and 15% of vinyl sebacate is a strong, tack-free and very flexible material quite unlike a copolymer made from a mixture of 35 to 45% vinyl chloride and 55 to 65% of 2-ethylhexyl acrylate which is a very soft and very tacky material.

Interpolymers very similar to those described in Examples 1 to 7 are obtained when up to 10 parts of acrylonitrile, vinylidene chloride, vinyl acetate, or methyl acrylate are polymerized together with a mixture containing 55 parts vinyl chloride, 40 parts of n-octyl acrylate, and 5 parts of monovinyl sebacate. Generally, however, the use of additional monomers does not result in additional valuable properties so that it is preferred to produce tripolymers from monomeric mixtures containing only the three specified types of monomers.

While the invention has been described with particular reference to certain preferred embodiments thereof, it is possible to make variations and modifications therein without departing from the spirit and scope of the invention as defined in the appended claims.

I claim:

1. An interpolymer made by polymerizing under acidic conditions a mixture of monomeric materials comprising from 35 to 90% by weight of vinyl chloride, from 5 to 65% by weight of an alkyl ester of acrylic acid, and from 0.2 to 25% by weight of an ester of the formula

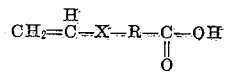

wherein X is an ester linkage and R is a divalent saturated aliphatic radical.

2. An interpolymer made by polymerizing in an acidic aqueous medium a mixture of monomeric materials consisting of from 40 to 85% by weight of vinyl chloride, from 10 to 50% by weight of an alkyl ester of acrylic acid in which the alkyl group contains from 4 to 10 carbon atoms and from 0.5 to 10% by weight of a monovinyl ester of a saturated dicarboxylic acid containing from 4 to 12 carbon atoms.

3. A tripolymer made by polymerizing in an acidic aqueous medium a mixture of monomeric materials consisting of from 40 to 85% by weight of vinyl chloride, from 10 to 50% by weight of an alkyl ester of acrylic acid in which the alkyl group contains a total of 8 to 10 carbon atoms and possesses a carbon chain of from 6 to 10 atoms, and from 0.5 to 10% by weight of a monovinyl ester of a saturated aliphatic dicarboxylic acid containing from 4 to 12 carbon atoms.

4. A tripolymer made by polymerizing in acidic aqueous emulsion a mixture of monomeric materials consisting of from 40 to 85% by weight of vinyl chloride, from 10 to 50% by weight of 2-ethylhexyl acrylate, and from 0.5 to 10% by weight of monovinyl sebacate.

5. A tripolymer made by polymerizing in acidic aqueous emulsion a mixture of monomeric materials consisting of from 40 to 85% by weight of vinyl chloride, from 10 to 50% by weight of n-octyl acrylate, and from 0.5 to 10% by weight of monovinyl sebacate.

6. A triploymer made by polymerizing in acidic aqueous emulsion a mixture of monomeric materials consisting of from 40 to 85% by weight of vinyl chloride, from 10 to 50% by weight of iso-octyl acrylate, and from 0.5 to 10% by weight of monovinyl sebacate.

7. A tripolymer made by polymerizing in acidic aqueous emulsion a mixture of monomeric materials consisting of from 40 to 85% by weight of vinyl chloride, from 10 to 50% by weight of 2-ethylhexyl acrylate and from 0.5 to 10% by weight of monovinyl adipate.

ROBERT J. WOLF.

REFERENCES CITED

The following references are of record in the file of this patent:

UNITED STATES PATENTS

| Number | Name | Date |
|--------|------|------|
| 2,147,154 | Fikentscher et al. | Feb. 14, 1939 |